United States Patent [19]

Oda et al.

[11] Patent Number: 4,536,259

[45] Date of Patent: Aug. 20, 1985

[54] CATHODE HAVING HIGH DURABILITY AND LOW HYDROGEN OVERVOLTAGE AND PROCESS FOR THE PRODUCTION THEREOF

[75] Inventors: Yoshio Oda; Hiroshi Otouma; Eiji Endoh, all of Yokohama, Japan

[73] Assignee: Asahi Glass Company Ltd., Tokyo, Japan

[21] Appl. No.: 511,945

[22] Filed: Jul. 8, 1983

[30] Foreign Application Priority Data

Jul. 16, 1982 [JP] Japan ................................ 57-122898

[51] Int. Cl.³ .......................... C25D 15/00; C25D 3/56
[52] U.S. Cl. .............................. 204/35.1; 204/290 R; 204/291; 204/293; 427/34; 427/352; 427/376.2; 427/376.6; 427/376.8; 427/423; 427/431; 204/43.1; 204/44.3; 204/44.5; 204/44.6
[58] Field of Search .................... 204/291, 290 R, 293, 204/35 R, 43 R, 43 G, 43 T, 43 N; 427/34, 352, 423, 431, 376.2, 376.6, 376.8

[56] References Cited

U.S. PATENT DOCUMENTS

| | | | |
|---|---|---|---|
| 4,279,709 | 7/1981 | McIntyre et al. | 427/423 |
| 4,325,994 | 4/1982 | Kitashima et al. | 427/423 |
| 4,414,064 | 11/1983 | Stachurshi et al. | 204/293 |
| 4,470,843 | 9/1984 | Oda et al. | 204/293 |

Primary Examiner—R. L. Andrews
Attorney, Agent, or Firm—Oblon, Fisher, Spivak, McClelland & Maier

[57] ABSTRACT

A cathode having high durability and low hydrogen overvoltage comprising an electrode substrate and an alloy layer formed thereon, characterized in that said alloy layer is made of an alloy comprising Component X selected from the group consisting of nickel, cobalt and a mixture thereof, Component Y selected from the group consisting of aluminum, zinc, magnesium and silicon, and Component Z selected from the group consisting of a noble metal and rhenium, and having a composition of Components X, Y and Z falling within the range defined by the following points A, B, C and D with reference to the diagram of FIG. 1:

A: X=99.6 wt. %, Y=0 wt. %, Z=0.4 wt. %
B: X=79.6 wt. %, Y=20 wt. %, Z=0.4 wt. %
C: X=10 wt. %, Y=20 wt. %, Z=70 wt. %
D: X=12.5 wt. %, Y=0 wt. %, Z=87.5 wt. %.

12 Claims, 4 Drawing Figures

CATHODE HAVING HIGH DURABILITY AND LOW HYDROGEN OVERVOLTAGE AND PROCESS FOR THE PRODUCTION THEREOF

The present invention relates to a cathode having high durability and low hydrogen overvoltage and a process for the production thereof. More particularly, the present invention relates to a cathode which hardly undergoes degradation of its properties even when subjected to an oxidizing environment and which has a low hydrogen overvoltage characteristic.

Various types of cathodes have been proposed as cathodes having low hydrogen overvoltage, particularly as cathodes for electrolysis of an aqueous solution of an alkali metal halide. Among them, the electrode proposed by the present applicant and disclosed in Japanese Unexamined Patent Publication No. 112785/1979, has superior effects with respect to low hydrogen overvoltage and its durability as compared with the electrodes known by that time. However, from a further research, the present inventors have found that the electrode disclosed in the above publication does not necessarily provide adequate durability in some cases. The present inventors have conducted extensive researches to solve the problem and finally accomplished the present invention.

As an industrial process for the production of chlorine and an alkali metal hydroxide, it is well known to obtain a halogen gas from an anode compartment and an aqueous alkali metal hydroxide solution and hydrogen gas from a cathode compartment in the electrolysis of an aqueous solution of an alkali metal halide in an electrolytic cell. As a cathode for such an electrolytic cell, it is preferred to use a cathode having low hydrogen overvoltage as mentioned above. During the operation of the electrolytic cell, it sometimes happens for various reasons that the operation must be stopped. In such a case, especially when the cell is short-circuited or the cathode is kept in a concentrated alkali metal hydroxide solution at high temperatures for a long time without supplying electricity, it has been found that the hydrogen overvoltage increases when the operation is resumed. The present inventors have studied this phenomenon, and finally found that nickel or cobalt as an electrochemically active component of Raney nickel particles or Raney cobalt particles is oxidized into nickel hydroxide or cobalt hydroxide, whereby the electrochemical activity is deteriorated, i.e. the hydrogen overvoltage increases. Further, it has been found that this deterioration can effectively be prevented by incorporating a third component selected from the group consisting of a noble metal and rhenium into known metal particles comprising a first component such as nickel or cobalt and a second component such as aluminum, zinc, magnesium or silicon, and that not only such metal particles but also an electrode having a surface layer having the same composition is equally effective. The present invention has been accomplished based on these discoveries.

Thus, present invention provides a cathode having high durability and low hydrogen overvoltage comprising an electrode substrate and an alloy layer formed thereon, characterized in that the alloy layer is made of an alloy comprising Component X selected from the group consisting of nickel, cobalt and a mixture thereof, Component Y selected from the group consisting of aluminum, zinc, magnesium and silicon, and Component Z selected from the group consisting of a noble metal and rhenium, and having a composition of Components X, Y and Z falling within the range defined by points, A, B, C and D of FIG. 1.

The present invention also provides a process for producing a cathode having high durability and low hydrogen overvoltage, which comprises applying onto an electrode substrate an electrochemically active alloy comprising Component X selected from the group consisting of nickel, cobalt and a mixture thereof, Component Y selected from the group consisting of aluminum, zinc, magnesium and silicon, and Component Z selected from the group consisting of a noble metal and rhenium, and having a composition falling within the range defined by point A', B', C' and D' of FIG. 4, by depositing particles of said alloy on the electrode substrate by a composite coating method, or forming an uniform layer of said alloy on the electrode substrate by a coating method, a dipping method or a sintering method.

Now, the present invention will be described in detail with reference to the preferred embodiments.

In the accompanying drawings, FIG. 1 is a diagram of a three-component composition comprising X=Ni or Co, Y=Al, Zn, Mg, or Si and Z=a noble metal or rhenium, and the composition within the range defined by points A, B, C and D represents the electrochemically active alloy composition of the alloy layer of the cathode according to the present invention.

In the present invention, the noble metal is meant for gold, silver and a platinum group metal such as platinum, rhodium, ruthenium, palladium, oxmium or iridium, as is well known.

Figure 1:
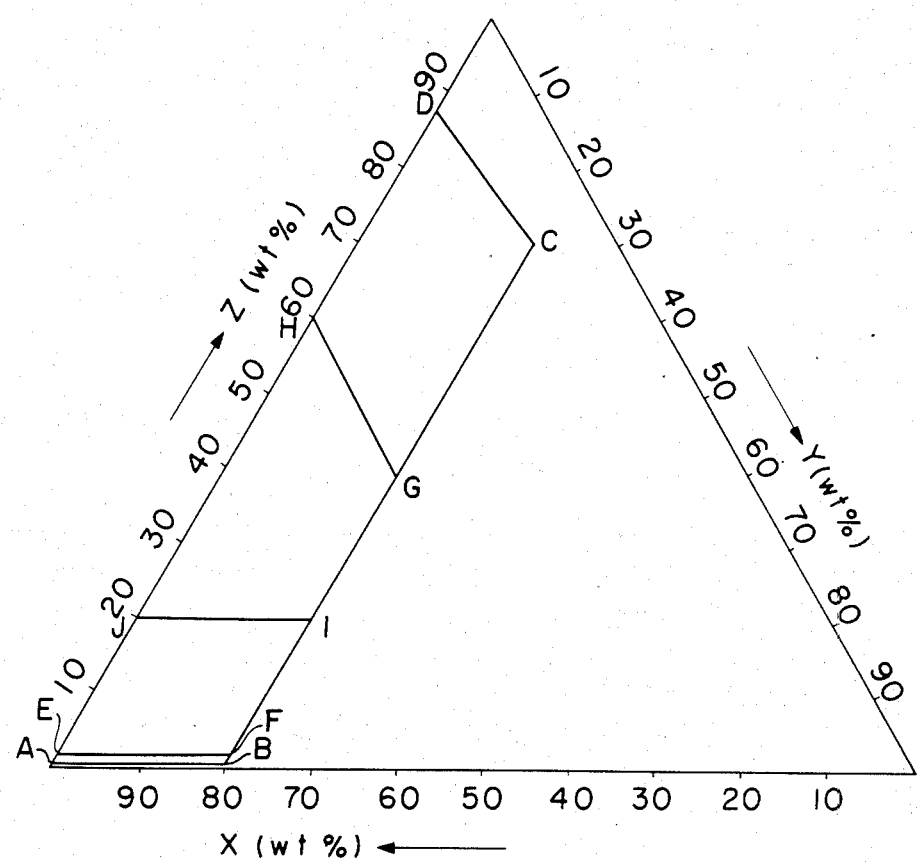

FIG. 1 is a diagram of the three-component composition comprising Component X selected from the group consisting of nickel, cobalt and a mixture thereof, Component Y selected from the group consisting of aluminum, zinc, magnesium and silicon, and Component Z selected from the group consisting of a noble metal and rhenium. The alloy composition of the alloy layer of the cathode according to the present invention is within the range defined by points A, B, C and D of FIG. 1. The alloy composition is preferably within the range defined by points E, F, G and H, further preferably within the range defined by points E, F, I and J.

The proportions of Components X, Y and Z at points A, B, C and D are as follows.

A: X=99.6 wt. %, Y=0 wt. %, Z=0.4 wt. %
B: X=79.6 wt. %, Y=20 wt. %, Z=0.4 wt. %
C: X=10 wt. %, Y=20 wt. %, Z=70 wt. %
D: X=12.5 wt. %, Y=0 wt. %, Z=87.5 wt. %.

Likewise, the proportions of Components X, Y and Z at points E, F, G, H, I and J are as follows:

E: X=98.4 wt. %, Y=0 wt. %, Z=1.6 wt. %
F: X=78.4 wt. %, Y=20 wt. %, Z=1.6 wt. %
G: X=40 wt. %, Y=20 wt. %, Z=40 wt. %
H: X=40 wt. %, Y=0 wt. %, Z=60 wt. %
I: X=60 wt. %, Y=20 wt. %, Z=20 wt. %
J: X=80 wt. %, Y=0 wt. %, Z=20 wt. %.

The effect of the present invention is obtained by incorporating a component selected from the group consisting of a noble metal and rhenium, as one component of the alloy composition. However, the reason why the deterioration of the electrochemical activity is prevented by the incorporation of this component, has not yet been clearly understood. However, it is conceivable that nickel hydroxide or cobalt hydroxide is reduced to originally active nickel or cobalt by the incorporation of this component. Further, it has been confirmed that among the metals of this component, platinum, rhodium and ruthenium are most effective to provide the effect of the present invention. Namely, when platinum, rhodium or ruthenium is used, it is possible to maintain the hydrogen overvoltage at an extreamly low level for a long period of time even under a severe environmental condition.

The alloy for the cathode of the present invention should have a composition within the range defined by points A, B, C and D of FIG. 1 because if the alloy has a composition outside the above range, there will be disadvantages such that the hydrogen overvoltage can not be maintained at a low level for an extended period of time or the hydrogen overvoltage tends to be high from the beginning, or even if a noble metal or rhenium is added in a great amount exceeding this range, no further reduction of the hydrogen overvoltage or no further improvement in the durability can be expected.

When the above alloy is in particle form, the average particle size may usually be in a range of 0.1 to 100 μm although it depends upon the porosity of the electrode surface and the dispersibility of the particles for the production of an electrode, which will be described hereinafter.

Within the above range, the particle size is preferably from 0.9 to 50 μm, more preferably from 1 to 30 μm, from the viewpoint of e.g. the porosity of the electrode surface.

Further, the alloy layer of the present invention is preferably porous at its surface so as to provide a low hydrogen overvoltage.

In the case where the alloy is in particle form, the porous surface does not necessarily mean that the entire surface of the particles is porous, and it is sufficient that only the portions of the surface exposed on the above-mentioned alloy layer are porous. In the case where the alloy is provided on the electrode substrate in the form of a layered structure such as a plated layer, the porosity may be provided by the irregularities, i.e. concavities and convexities, of the layer surface.

In general, the greater the porosity, the better. However, an excessive porosity tends to lead to poor mechanical strength. Accordingly, the porosity is preferably from 20 to 90%. Within this range, the porosity is more preferably from 35 to 85%, particularly from 50 to 80%.

The porosity is measured by a conventional water substituting method. Various methods may be employed to form a porous surface. Whether or not the alloy is in particle form, it is preferred to employ a method wherein the porosity is provided, for instance, by partially or entirely removing Component Y from an alloy comprising Components X, Y and Z.

In this case, it is particularly preferred to employ a method which comprises treating an alloy comprising predetermined proportions of uniformly distributed Components X, Y and Z, with an alkali metal hydroxide to remove at least partially the metal of Component Y.

In the case where the cathode of the present invention is used as a cathode for producing an alkali metal hydroxide by the hydrolysis of an aqueous solution of an alkali metal halide, it is not necessarily required to pretreat it with an alkali hydroxide prior to mounting it in the electrolytic cell. In such a case, the catholyte is a solution of an alkali metal hydroxide, and the metal of Component Y is gradually removed during the electrolysis, whereby a desired cathode is obtainable.

Various combinations of the above-mentioned metal particles may be used as the composition of cathode. Typical combinations include Ni-Al-Pt, Ni-Al-Rh, Ni-Al-Ru, Ni-Zn-Pt, Ni-Zn-Rh, Ni-Zn-Ru, Ni-Si-Pt, Ni-Si-Rh, Ni-Si-Ru, Co-Al-Pt, Co-Al-Rh, Co-Al-Ru, Co-Zn-Pt, Co-Zn-Rh, Co-Zn-Ru, Co-Si-Pt, Co-Si-Rh, Co-Si-Ru, Ni-Mg-Pt, Ni-Mg-Rh, Ni-Mg-Ru, Co-Mg-Pt, Co-Mg-Rh and Co-Mg-Ru.

Particularly preferred combinations among them are Ni-Al-Pt, Ni-Al-Rh, Ni-Al-Ru, Co-Al-Pt, Co-Al-Rh and Co-Al-Ru.

The conditions for the alkali metal hydroxide treatment may vary depending upon the composition of the particular alloy. However, in the case of the alloy having the composition mentioned hereinafter, it is preferred to immerse it in an aqueous solution having an alkali metal hydroxide concentration (as calculated as NaOH) of from 10 to 35% by weight at a temperature of from 10° to 50° C. for from 0.5 to 3 hours. These conditions are selected to readily remove Component Y.

Further, Component Z is the one which is not removed by the above-mentioned alkali treatment.

In the case where the above-mentioned alloy is in particle form, the layer for firmly bonding the particles to the metal substrate is preferably made of the same metal as Component X of the alloy particles.

Thus, in the case where the alloy is in particle form, numerous alloy particles are bonded on the electrode surface of the cathode of the present invention, whereby the surface of the cathode macroscopically presents a fine porous structure.

In the case where the surface of the electrode substrate is uniformly coated with an alloy layer, no binder metal layer exists as opposed to the case where the alloy particles are used.

Thus, in the cathode of the present invention, the electrode surface is covered with an alloy containing nickel and/or cobalt having by itself a low hydrogen overvoltage, and, as mentioned above, the electrode surface has a fine porous structure to present a larger electrochemically active surface area, whereby the hydrogen overvoltage can be effectively reduced by the synergistic effect.

Further, in the case where the alloy particles are used in the present invention, they are firmly bonded to the electrode surface by the layer composed of the above-mentioned metal, whereby deterioration due to the falling off of the bonded particles is minimized and the superior effect for the maintenance of the low hydrogen overvoltage will be ensured.

In the present invention, the electrode substrate can be made of a suitable electroconductive metal such as Ti, Zr, Fe, Ni, V, Mo, Cu, Ag, Mn, platinum group metals, graphite and Cr, and alloys thereof. Among them, it is preferred to use Fe, a Fe-alloy (a Fe-Ni alloy, a Fe-Cr alloy or a Fe-Ni-Cr alloy), Ni, a Ni-alloy (a Ni-Cu alloy or a Ni-Cr alloy), Cu or a Cu-alloy. Particularly preferred materials for the electrode substrate are Fe, Cu, Ni, a Fe-Ni alloy and a Fe-Ni-Cr alloy.

The size and configuration of the electrode substrate may be optionally adjusted to conform with the structure of the electrode to be used. For instance, the substrate may be in the form of a plate, a foraminous sheet, a net (such as an expanded metal) or a parallel screen type, which may be flat, curved or cylindrical.

The thickness of the alloy layer of the present invention is preferably from 20 to 200 $\mu$m, more preferably from 25 to 150 $\mu$m, particularly from 30 to 100 $\mu$m.

Figure 2:
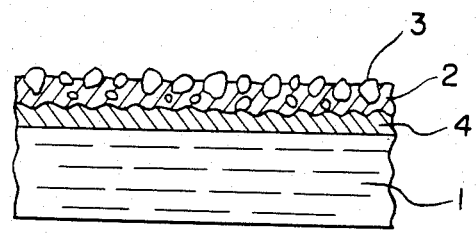
FIG. 2 is a cross sectional view of the surface portion of an electrode of the present invention.
Figure 3:
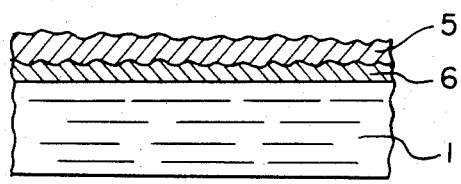
FIG. 3 is a cross sectional view of the surface portion of another electrode according to the present invention.

FIGS. 2 and 3 illustrate cross sections of the electrode surfaces according to the present invention. As shown in FIG. 2, a metal layer 2 is formed on an electrode substrate 1 with a middle layer 4 interposed between them. The metal layer contains electrochemically active metal particles 3, and the metal particles are partially exposed on the surface of the layer. The proportion of the particles in the layer 2 is preferably from 5 to 80% by weight, more preferably from 10 to 50% by weight. The durability of the electrode of the present invention can be further improved by providing a middle layer composed of a metal selected from the group consisting of Ni, Co, Ag and Cu, between the electrode substrate and the metal layer containing alloy particles. Such a middle layer may be made of the same or different metal as the metal in the above-mentioned metal layer. However, in view of the bonding property of the middle layer with the above-mentioned metal layer, it is preferred that the middle layer is made of the same metal as the above-mentioned metal layer. From the viewpoint of e.g. the mechanical strength, the thickness of the middle layer is preferably from 5 to 100 $\mu$m, more preferably from 20 to 80 $\mu$m, particularly from 30 to 50 $\mu$m.

However, it is not essential to provide such a middle layer.

FIG. 3 is a cross sectional view of the cathode of the present invention wherein the surface of the electrode substrate is uniformly coated with an alloy layer. Reference numeral 1 designates an electrode substrate, numeral 5 designates a uniform surface layer made of an electrochemically active alloy, and numeral 6 designates a middle layer.

In the electrode of the present invention as illustrated in FIG. 2, numerous particles are exposed on the electrode surface, whereby the porosity of the surface layer is mainly provided by the spaces between the particles, and the voids formed by the removal of Component Y of the alloy also contribute to the porosity.

As mentioned above, the degree of the porosity relates to the reduction of hydrogen overvoltage, and it is sufficient for the purpose of the present invention if it provides an electrical double layer capacity of at least 1000 $\mu$F/cm$^2$. Within this range, the electrical double layer capacity is preferably at least 2000 $\mu$F/cm$^2$, more preferably at least 5000 $\mu$F/cm$^2$.

The electrical double layer capacity is an electrostatic capacity of the electrical double layers formed by the positive and negative ions distributed in a face-to-face relationship with a short distance from each other near the surface of the electrode when the electrode is immersed in an electrolyte, and it is measured as a differential capacity.

The capacity increases with an increase of the surface area of the electrode. Accordingly, with an increase of the porosity of the electrode surface and the consequential increase of the surface area of the electrode, the electrical double layer capacity of the electrode surface increases. Thus, the electrochemically effective surface area of the electrode i.e. the degree of the porosity of the electrode surface can be determined by the electrical double layer capacity.

The electrical double layer capacity varies depending upon the temperature at the time of the measurement, the kind and concentration of the electrolyte and the electrode potential, and for the purpose of the present invention, the electrical double layer capacity is meant for the values measured by the following method.

A test piece (i.e. an electrode) is immersed in an aqueous solution (25° C.) containing 40% by weight of NaOH and a platinum black coated platinum plate having an apparent surface area of about 100 times the surface area of the test piece is immersed as a counter electrode, whereby a cell-impedance is measured by a vector-impedance meter to obtain the electrical double layer capacity of the test piece.

Various methods may be used for practically forming the surface layer on the electrode. For instance, a composite coating method, a melt-coating method, a sintering method, an alloy plating method or a melt-dipping method may be employed.

When alloy particles are used, it is particularly preferred to employ a composite coating method, since the particles of the present invention can thereby effectively be coated on the electrode surface.

The composite coating method is conducted in such a manner that into an aqueous solution containing a kind of metalions to form the metal layer, alloy particles mainly composed of e.g. nickel are dispersed to obtain a plating bath, and electroplating is carried out in the plating bath by using an electrode substrate as a cathode so that the above metal and the alloy particles are co-electrodeposited on the electrode substrate. More specifically, the particles in the bath are considered to become bipolar by the influence of the electric field, and when they approach close to the surface of the cathode, the local cathode current density increases and when they get in contact with the cathode, they are co-electrodeposited with the metal on the substrate by the reduction of the metal ions. For instance, when a nickel layer is used as the metal layer, a nickel chloride bath, a high nickel chloride bath or a nickel chloride-nickel acetate bath may be employed. When a cobalt layer is used as a metal layer, a cobalt chloride bath, a high cobalt chloride bath or a cobalt chloride-cobalt acetate bath may be employed.

In this case, the pH of the bath is important. Namely, in many cases, it is usual that oxygen is deposited or certain oxide films are formed on the surface of electrochemically active metal particles to be dispersed in the plating bath. In such a state, the bonding strength of the particles with the metal layer will be inadequate, and consequently, it will be likely that the particles will fall off during the use as an electrode. In order to prevent this from happening, it is necessary to minimize the oxygen deposition or the formation of oxide films on the surface of the particles. For this purpose, it is preferred to adjust the pH of the plating bath to be from 1.5 to 3.0.

Figure 4:
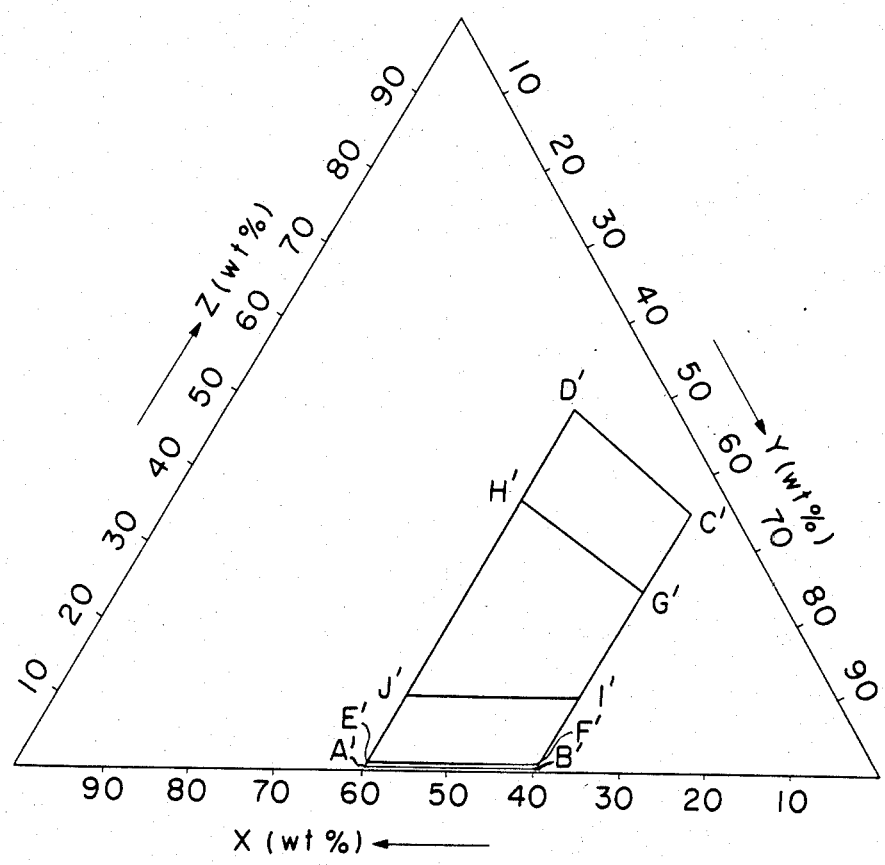
FIG. 4 is a diagram of a three-component composition comprising X=Ni or Co, Y=Al, Zn, Mg or Si and Z=a noble metal or rhenium, and the composition within the range of points A', B', C' and D' represents the composition of the electrochemically active alloy to be used in the process of the present invention.

In the process of the present invention, the metal particles or the alloy layer is made of an alloy comprising Component X selected from the group consisting of nickel, cobalt and a mixture thereof, Component Y selected from the group consisting of aluminum, zinc, magnesium and silicon, and Component Z selected from the group consisting of a noble metal and rhenium, and having a composition falling within the range defined by points A', B', C' and D' of FIG. 4.

The proportions of the alloy Components (X, Y and Z) at point A', B', C' and D' in FIG. 4 are as follows:

A': X=59.8 wt. %, Y=40 wt. %, Z=0.2 wt. %
B': X=39.8 wt. %, Y=60 wt. %, Z=0.2 wt. %
C': X=5 wt. %, Y=60 wt. %, Z=35 wt. %
D': X=12 wt. %, Y=40 wt. %, Z=48 wt. %,

The composition is preferably within the range defined by points E', F', G' and H', more preferably within the range defined by points E', F', I' and J'. The proportions of Components X, Y and Z at points E', F', G', H', I' and J' are as follows:

E': X=59.2 wt. %, Y=40 wt. %, Z=0.8 wt. %
F': X=39.2 wt. %, Y=60 wt. %, Z=0.6 wt. %
G': X=16 wt. %, Y=60 wt. %, Z=24 wt. %
H': X=24 wt. %, Y=40 wt. %, Z=36 wt. %
I': X=30 wt. %, Y=60 wt. %, Z=10 wt. %
J': X=50 wt. %, Y=40 wt. %, Z=10 wt. %.

If the composition is outside the above range, there will be disadvantages such that no adequate deposition tends to be secured by the composite coating process, no adequate bonding strength will be obtained even when an adequate amount has been co-deposited, or the electrochemical catalytic activity of the electrode after the extraction of Component Y will be inadequate. Further, even when the amount of the noble metal exceeds the range of the present invention, no additional effectiveness for the reduction of the hydrogen overvoltage or no further improvement of the durability will be thereby obtained.

When the composite coating is conducted in a plating bath in which alloy particles are dispersed, the amount of the particles in the bath is preferably from 1 to 200 g/l, more preferably from 1 to 50 g/l, particularly from 1 to 10 g/l in order to ensure good bonding of the particles to the electrode surface. Further, the composite coating operation is preferably conducted at a temperature of from 20° to 80° C., particularly from 30° to 60° C. at a current density of 1 to 20 A/dm$^2$, particularly from 1 to 10 A/dm$^2$.

Further, additives such as an additive to reduce the strain of the coating or an additive to facilitate co-electrodeposition may optionally be added to the plating bath.

When a middle layer is to be formed between the electrode substrate and the particle-containing metal layer as mentioned above, the electrode substrate is firstly plated with Ni, Co or Cu, and then the particle-containing metal layer is formed thereon by the above-mentioned composite coating method or melt-spraying method.

In such a case, the above-mentioned various plating baths may be employed as the plating bath. In the case of the Cu plating, conventional plating baths may be employed.

Thus, it is possible to obtain an electrode wherein the particles of the present invention are co-deposited on the electrode substrate with the metal layer interposed between them.

Now, specific methods for uniformly forming an electrochemically active alloy layer on the electrode substrate will be described.

The specific methods include a coating method, a dipping method, a sintering method and an electroplating method, as mentioned above.

As the coating method, it is preferred to employ a method wherein a slender rod or powder of the alloy as shown in FIG. 4 is melted and sprayed. For this melt spraying, there may be employed a plasma spray apparatus or an oxygen-hydrogen flame or oxygen-acetylene flame spray apparatus which is commonly used in a melt-coating method.

The dipping method is a method wherein an electrode substrate is dipped in a molten liquid of the above-mentioned alloy to form a coating layer of the alloy on the substrate, whereby the temperature of the molten alloy liquid is preferably higher by from 50° to 200° C. than the melting point of said alloy. For instance, in the case of Ni-Al-Ru, the melting point is about 1500° C., and accordingly the dipping is conducted at a temperature of about 1600° C. and a coating layer of the alloy is formed on the electrode substrate when the dipped substrate is taken out.

The sintering method is a method wherein preliminarily prepared fine particles having a particle size of not greater than 100 $\mu$m are coated on the electrode substrate by using a suitable polymer, particularly an aqueous solution of a water-soluble polymer, and then heated to burn off the binder and to sinter the particles and bond them to the substrate. Usually, the operation is conducted at a temperature lower by from 100° to 300° C. than the melting point, and the sintering is preferably conducted under elevated pressure.

The electroplating method is a so-called alloy plating method wherein a solution (preferably an aqueous solution) of metal salt, of which Components X, Y and Z fall within the range shown in FIG. 4, is prepared, and an electrode substrate is immersed as a cathode in the solution, thereby to conduct electroplating. However, when Component Y is Al or Mg, this method can not be employed. This method can be employed when Component Y is Zn. Commonly employed conditions may be used as the plating conditions. For instance, the electroplating may be conducted at a temperature of about 60° C. at a current density of about 1 A/dm$^2$ in a solution of the mixture of NiSO$_4$·7H$_2$O, ZnSO$_4$, KReO$_4$ and (NH$_4$)$_2$SO$_4$ with its pH adjusted at 4.0, whereby an alloy layer of Ni-Zn-Re can be formed.

It is also effective to deposit a non-electronic conduction substance on the surface of the low hydrogen voltage cathode thus obtained.

When the cathode of the present invention is used as a cathode for electrolysis of e.g. an aqueous solution of an alkali metal halide, it sometimes happens that the catholyte contains dihypoferrite ion (HFeO$_2^-$) or other ion-containing ions dissolved from the material of the surrounding electrolytic cell and these ions discharge on the cathode to precipitate an iron compound (for instance iron metal) on the cathode. In such a case, the electrochemical activity of the cathode surface will be lost and consequently the cathode overvoltage will increase.

In order to prevent such precipitation, it is effective to partially deposit an electrically nonconductive substance such as a fluorine-containing resin (for example, PTFE) on the cathode of the present invention or on the metal particles exposed on the cathode surface. As a specific method for this purpose, it is preferred to employ a method as disclosed in Japanese Patent Application No. 126921/1981.

If necessary, the cathode thus obtained may be subjected to treatment with an alkali metal hydroxide (for instance, by immersing it in an aqueous alkali metal hydroxide solution) to remove at least partially the metal of Component Y in the alloy particles and to form a porous structure on the particles or on the surface layer of the electrode.

The conditions for such treatment are as described above.

When an alloy comprising the above-mentioned Components X, Y and Z is used, it is preferred to conduct the above-mentioned alkali metal hydroxide treatment. However, the electrode coated with such an alloy may be mounted on an alkali metal chloride electrolytic cell as it is, i.e. without subjecting it to the alkali metal hydroxide treatment and the electrolysis may be thereby conducted.

In such a case, the metal of Component Y dissolves during the process of the electrolysis, whereby the electrode overvoltage will be reduced. Although the resulting aqueous alkali metal hydroxide solution may be slightly contaminated with the dissolved metal ions of Component Y, such contamination is usually negligible and does not create a problem.

The electrode of the present invention can be used as an electrode, especially as a cathode, for electrolysis of an aqueous solution of an alkali metal chloride in an ion exchange membrane process. It may be used also as an electrode for electrolysis of an aqueous alkali metal chloride solution by means of a porous diaphragm such as an asbestos diaphragm.

Now, the present invention will be described in further detail with reference to Examples.

EXAMPLES 1 to 16

Alloy powders (200 mesh pass) having the compositions as identified in Table 1 were prepared. With respect to Examples 1 to 10 and 14 to 16, low hydrogen overvoltage electrodes were prepared by a composite coating method in accordance with Example 12 of Japanese Unexamined Patent Publication No. 112785/1979. With respect to Examples 11 to 13, low hydrogen overvoltage electrodes were prepared by a composite coating method in accordance with Example 12 of the same publication except that the coating method was modified by replacing $NiCl_2 \cdot 6H_2O$ and the Ni plate anode by $CoCl_2 \cdot 6H_2O$ (concentration: 300 g/l) and a Co plate anode, respectively. (However, the leaching treatment after the plating was conducted at a temperature of 50° C.)

With respect to each electrode thus obtained, the metal particles on the electrode were partially sampled and their composition was examined. The results are shown in Table 1. Further, the electrical double layer capacity was measured by the above-mentioned method, and the results are also shown in Table 1.

Then, tests for resistance against short-circuiting of the cee were conducted by using these electrodes as cathodes for a sodium chloride electrolytic cell wherein $RuO_2$—$TiO_2$ was used as anodes and a fluorine-containing cation exchange membrane (a copolymer of $CF=CF_2$ with $CF_2=CFO(CF_2)_3COOCH_3$ manufactured by Asahi Glass Company Ltd., an ion-exchange capacity of 1.45 meq/g resin) was used as an ion-exchange membrane. Electrolysis was conducted at 90° C. at a current density of 20 A/dm$^2$ using a 3N NaCl solution as the anolyte and a 35% NaOH solution as the catholyte. On the third day from the initiation of the electrolysis, the following short-circuiting test was carried out.

Firstly, the supply of an electric current from the direct current power source was stopped, and the anode and cathode were connected outside the electrolytic cell by a copper wire and left to stand for about 15 hours in that state. During this period, the electric current from the cathode to the anode was measured. The catholyte temperature was maintained at 90° C. for about 3 hours after the termination of the electrolysis, and then the cell was allowed to cool naturally. This operation was repeated 5 times and then the cell was left to cool for 15 hours. Thereafter, the cathode was taken out and the hydrogen overvoltage was measured. The results are shown in Table 1. The hydrogen overvoltage was almost the same as the one measured prior to the tests.

Further, the electrode of Example 3 was immersed in a 50% NaOH aqueous solution at 140° C. for 3 weeks. To permit adequate contact with air, the depth of the container was set as shallow as 7 cm and the top of the container was open. The hydrogen overvoltage of this electrode was measured before and after the immersing test. The hydrogen overvoltage was 0.09 V, and no substantial change was observed between the values measured before and after the test.

COMPARATIVE EXAMPLES 1 to 2

With respect to Comparative Example 1, a Ni-Al alloy powder composite coated electrode was prepared by the coating method of Example 12 in Japanese Patent Publication No. 112785/1979. With respect to Comparative Example 2, a Co-Al alloy powder composite coated electrode was prepared by the coating method of Example 12 of the same publication except that the coating method was modified by replacing $NiCl_2 \cdot 6H_2O$ and the Ni plate anode by $CoCl_2 \cdot 6H_2O$ (concentration: 300 g/l) and a Co plate anode, respectively. With respect to each electrode, the metal particles on the electrode were partially sampled and their composition was examined. The results are shown in Table 2. Further, the electrical double layer capacity of each electrode is also presented in Table 2.

The short-circuiting test was conducted in the same manner as in Examples 1 to 16, and the change in the hydrogen overvoltage before and after the test was measured. The results are shown in Table 2 together with the values of the hydrogen overvoltage measured before the tests.

COMPARATIVE EXAMPLES 3 to 6

Cathodes were prepared in the same manner as the Examples except that the alloy powder compositions were changed to those of Comparative Examples 3 to 6 as identified in Table 2. The electrical double layer capacity of each electrode thereby obtained is also presented in Table 2. Further, the results of short-circuiting tests conducted in the same manner as the Examples are also shown in Table 2.

Comparative Examples 3 and 4 show that even if the third component is incorporated in a great amount, no further improvement of the properties is obtained. Comparative Examples 5 and 6 show that if the metal compositions of the starting material powders are outside the range specified by the present invention, the overvoltage is originally greater than the values obtained by using the metal powders with the composition of this invention.

TABLE 1

| Exp. | X (%) Ni | X (%) Co | Y (%) Al | Y (%) Zn | Z (%) Ru | Z (%) Rh | Z (%) Pt | Z (%) Re | Hydrogen overvoltage (V) | Composition after the NaOH treatment (%) X | Composition after the NaOH treatment (%) Y | Composition after the NaOH treatment (%) Z | Electrical double layer capacity (μF/cm²) |
|---|---|---|---|---|---|---|---|---|---|---|---|---|---|
| 1 | 49.7 | | 50 | | 0.3 | | | | 0.11 | 93.5 | 6 | 0.5 | 21,000 |
| 2 | 49.5 | | 50 | | 0.5 | | | | 0.10 | 91.2 | 8 | 0.8 | 22,000 |
| 3 | 45 | | 50 | | 5 | | | | 0.07 | 84 | 8 | 8 | 23,000 |
| 4 | 40 | | 50 | | 10 | | | | 0.05 | 88 | 5 | 17 | 20,000 |
| 5 | 35 | | 55 | | 10 | | | | 0.05 | 70 | 10 | 20 | 21,000 |
| 6 | 45 | | 45 | | 10 | | | | 0.05 | 74 | 10 | 16 | 20,000 |
| 7 | 45 | | 50 | | | 5 | | | 0.06 | 84 | 7 | 9 | 19,000 |
| 8 | 45 | | 50 | | | | 5 | | 0.06 | 85 | 8 | 7 | 20,000 |
| 9 | 45 | | 50 | | | | | 5 | 0.07 | 84 | 8 | 8 | 23,000 |
| 10 | 40 | | | 50 | 10 | | | | 0.05 | 88 | 4 | 18 | 20,000 |
| 11 | | 45 | 50 | | 5 | | | | 0.07 | 85 | 9 | 7 | 25,000 |
| 12 | | 45 | | 50 | 5 | | | | 0.06 | 83 | 8 | 9 | 27,000 |
| 13 | | 45 | | 50 | | 5 | | | 0.07 | 85 | 9 | 7 | 24,000 |
| 14 | 20 | 25 | 50 | | 5 | | | | 0.07 | 84 | 9 | 7 | 22,000 |
| 15 | 20 | | 55 | | | | 25 | | 0.04 | 45 | 5 | 50 | 18,000 |
| 16 | 20 | | 45 | | | | 35 | | 0.04 | 27 | 6 | 67 | 17,000 |

TABLE 2

| Comparative Exp. | X (%) Ni | X (%) Co | Y (%) Al | Y (%) Zn | Z (%) Ru | Z (%) Pt | Hydrogen overvoltage (V) Short-circuit test | | Composition after the NaOH treatment (%) X | Composition after the NaOH treatment (%) Y | Composition after the NaOH treatment (%) Z | Electrical double layer capacity (μF/cm²) |
|---|---|---|---|---|---|---|---|---|---|---|---|---|
| 1 | 50 | | 50 | | | | 0.08 | 0.14 | 93 | 7 | 0 | 15,000 |
| 2 | | 50 | 50 | | | | 0.09 | 0.15 | 94 | 6 | 0 | 16,000 |
| 3 | 5 | | 55 | | 40 | | 0.05 | 0.05 | 11 | 8 | 81 | 16,000 |
| 4 | 5 | | 45 | | | 50 | 0.05 | 0.05 | 8 | 7 | 85 | 18,000 |
| 5 | 80 | | 10 | | 10 | | 0.20 | 0.20 | 83 | 5 | 12 | 850 |
| 6 | 80 | | | 10 | 10 | | 0.21 | 0.21 | 84 | 5 | 11 | 800 |

We claim:

1. A cathode having high durability and low hydrogen overvoltage comprising an electrode substrate and an alloy layer formed thereon, characterized in that said alloy layer is made of an alloy comprising Component X selected from the group consisting of nickel, cobalt and a mixture thereof, Component Y selected from the group consisting of aluminum, zinc, magnesium and silicon, and Component Z selected from the group consisting of a noble metal and rhenium, and having a composition of Components X, Y and Z falling within the range defined by the following points A, B, C and D with reference to the diagram of FIG. 1:
   A: X=99.6 wt. %, Y=0 wt. %, Z=0.4 wt. %
   B: X=79.6 wt. %, Y=20 wt. %, Z=0.4 wt. %
   C: X=10 wt. %, Y=20 wt. %, Z=70 wt. %
   D: X=12.5 wt. %, Y=0 wt. %, Z=87.5 wt. %.

2. The cathode according to claim 1, wherein alloy particles in the alloy layer are partially exposed on the surface of the layer formed on the electrode substrate.

3. The cathode according to claim 1, wherein the alloy layer has an electrical double layer capacity of at least 1000 μF/cm².

4. A process for producing a cathode having high durability and low hydrogen overvoltage, which comprises applying onto an electrode substrate an electrochemically active alloy comprising Component X selected from the group consisting of nickel, cobalt and a mixture thereof, Component Y selected from the group consisting of aluminum, zinc, magnesium and silicon, Component Z selected from a noble metal and rhenium, and having a composition falling within the range defined by the following points A', B', C', and D' with reference to the diagram of FIG. 4, by depositing particles of said alloy on the electrode substrate by a composite coating method, or forming a uniform layer of said alloy on the electrode substrate by a coating method, a dipping method, a sintering method or an electroplating method:
   A': X=59.8 wt. %, Y=40 wt. %, Z=0.2 wt. %
   B': X=39.8 wt. %, Y=60 wt. %, Z=0.2 wt. %
   C': X=5 wt. %, Y=60 wt. %, Z=35 wt. %
   D': X=12 wt. %, Y=40 wt. %, Z=48 wt. %.

5. The process according to claim 4, wherein the composite coating method is conducted by uniformly dispersing the alloy particles into a plating bath and co-depositing them onto the electrode substrate from the plating bath.

6. The process according to claim 4, wherein the coating method is conducted by spraying the alloy particles onto the substrate.

7. The process according to claim 4, wherein the dipping method is conducted by dipping the electrode substrate in a molten bath of said alloy.

8. The process according to claim 4, wherein the electroplating method is an alloy plating method.

9. The process according to claim 5, wherein the plating bath contains metal ions of the same metal as Component X.

10. The process according to claim 5, wherein the plating bath has a pH of from 1.5 to 3.0.

11. The process according to claim 9, wherein the plating bath has a pH of from 1.5 to 3.0.

12. The process according to claim 4, wherein the alloy layer formed on the substrate by the composite coating method, the dipping method, the coating method, the sintering method or the electroplating method, is treated in an aqueous sodium hydroxide solution having a NaOH concentration of from 10 to 35% at a temperature of from 10° to 50° C. for from 0.5 to 3 hours.

* * * * *